United States Patent
Göttlicher et al.

(10) Patent No.: US 10,647,257 B2
(45) Date of Patent: May 12, 2020

(54) REAR-VIEW SENSOR SYSTEM AND MOTOR VEHICLE

(71) Applicant: SMR Patents S.à.r.l., Luxembourg (LU)

(72) Inventors: Stefanie Göttlicher, Stuttgart (DE); Ilka Rötzer, Stuttgart (DE); Matthias Koller, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/114,794

(22) Filed: Aug. 28, 2018

(65) Prior Publication Data

US 2019/0061625 A1 Feb. 28, 2019

(30) Foreign Application Priority Data

Aug. 29, 2017 (DE) .................. 10 2017 119 832

(51) Int. Cl.
| | | |
|---|---|---|
| *G09F 9/00* | (2006.01) | |
| *B60R 1/00* | (2006.01) | |
| *B60R 11/04* | (2006.01) | |
| *G01S 17/931* | (2020.01) | |
| *B60R 1/06* | (2006.01) | |

(Continued)

(52) U.S. Cl.
CPC .............. *B60R 1/001* (2013.01); *B60R 1/00* (2013.01); *B60R 1/06* (2013.01); *B60R 11/04* (2013.01); *G01S 17/931* (2020.01); *B60R 2001/1253* (2013.01); *B60R 2300/10* (2013.01); *B60R 2300/8026* (2013.01); *G01S 2013/9317* (2013.01); *G01S 2013/93272* (2020.01)

(58) Field of Classification Search
CPC ... B60R 1/001; B60R 1/06; B60R 2001/1253; B60R 2300/8026; B60R 1/00; B60R 11/04; B60R 2033/10; G01S 2013/9317; G01S 2013/9378; G01S 17/936
USPC ........................................................ 340/461
See application file for complete search history.

(56) References Cited

U.S. PATENT DOCUMENTS

| | | | | |
|---|---|---|---|---|
| 2003/0081123 A1* | 5/2003 | Rupe | .................... | G07C 5/0891 348/148 |
| 2003/0202097 A1* | 10/2003 | Kallhammer | ............. | B60R 1/00 348/148 |

(Continued)

FOREIGN PATENT DOCUMENTS

| | | |
|---|---|---|
| DE | 19824855 A1 | 12/1999 |
| DE | 102013014708 A1 | 3/2015 |

(Continued)

OTHER PUBLICATIONS

German Office Action dated Dec. 5, 2017 of German application No. DE 102017119832.6.

*Primary Examiner* — Naomi J Small
(74) *Attorney, Agent, or Firm* — Jones Day

(57) ABSTRACT

A rear-view sensor system for a motor vehicle includes at least one sensor in the form of at least one of a rear-view camera and a lidar sensor positioned in the motor vehicle interior between a bodywork roof and a rear window, and a position-changing apparatus which moves the at least one sensor back and forth between a rest position and at least one operating position, where the at least one sensor is arranged in a recess in the rest position and is arranged right behind an upper part of the rear window in the at least one operating position.

11 Claims, 1 Drawing Sheet

(51) Int. Cl.
*G01S 13/931* (2020.01)
*B60R 1/12* (2006.01)

(56) References Cited

U.S. PATENT DOCUMENTS

| | | | | |
|---|---|---|---|---|
| 2003/0210328 | A1* | 11/2003 | Mazzilli | B60R 1/12 |
| | | | | 348/148 |
| 2009/0289811 | A1* | 11/2009 | Chou | B60R 1/00 |
| | | | | 340/901 |
| 2015/0002669 | A1* | 1/2015 | Reed | G07C 5/0808 |
| | | | | 348/148 |
| 2015/0015706 | A1* | 1/2015 | Hatori | G06K 9/00832 |
| | | | | 348/148 |
| 2017/0064165 | A1* | 3/2017 | Onishi | H04N 5/2252 |
| 2017/0369003 | A1* | 12/2017 | Williams | B60R 13/0212 |
| 2018/0215344 | A1* | 8/2018 | Santora | H04N 5/2258 |

FOREIGN PATENT DOCUMENTS

| | | | |
|---|---|---|---|
| EP | 2361806 | A2 | 8/2011 |
| JP | 2010-79 123 | A | 4/2010 |

\* cited by examiner

REAR-VIEW SENSOR SYSTEM AND MOTOR VEHICLE

CROSS-REFERENCE TO RELATED APPLICATIONS

This application claims the benefit of foreign priority to German Patent Application No. DE 10 2017 119 832.6, filed Aug. 29, 2017, which is herein incorporated by reference in its entirety for all purposes.

BACKGROUND

1. Field of the Invention

The following description relates to a rear-view sensor system for a motor vehicle. In a preferred example, the rear-view sensor system includes a rear-view camera in the vehicle interior between the bodywork roof and the rear window. In addition, the following description relates to a motor vehicle including the rear-view sensor system.

2. Related Art

Camera lenses of camera systems, which are located on the exterior of a motor vehicle, can quickly become dirty due to environmental influences such as dust, moisture, temperature differences, etc. This constitutes a safety risk since the exterior view acquired by a camera is not reproduced correctly. A clear view of the rear area is typically always provided, particularly in the case of rear camera systems. This means that dirt in the field of view must be avoided. For this reason, various cleaning systems exist for such camera systems.

The use and the associated outlay of such additional cleaning systems can be avoided, in particular in the case of rear camera systems, by mounting same in the vehicle interior. Preferably, by mounting same in the region below the vehicle roof and behind the rear window. This mounting location is advantageous since, in many motor vehicles, the rear window is hardly affected by impurities and in wet conditions the moisture is eliminated by the flow of air. On the other hand, a window cleaning system is generally already present in motor vehicles which have rear windows which quickly become dirty.

A camera monitoring device for a rear driving area at such a mounting location is described in EP 2 361 806 A2. The camera monitoring device is a generic rear-view camera system and includes a housing in which two cameras for respectively capturing images of the rear driving area are arranged and which can be positioned on an inner side of a rear window of a vehicle. The housing has a housing window, through which the cameras can in each case capture an image of the rear driving area. The cameras in the housing are in each case arranged in a fixed position with respect to the housing and are aligned deviating from one another such that their respective detection ranges at least partially overlap in the vertical direction and, at least during driving, the camera aligned with the horizon is switched on in order to monitor the far range as well as, at least during reversing, the camera aligned with the ground is switched on in order to monitor the close range.

Since the known camera monitoring device is rigidly mounted in a housing in the interior, the camera lenses of the device are also exposed to the prevailing influences in the interior beyond the period of use and, at the same time, the influences of the environment. For example, when the vehicle doors are opened and closed. Especially in the case of motor vehicles, in which the rear window is part of a tailgate, the camera lenses can be directly exposed to impure environmental influences when the tailgate is opened and closed. The use of two cameras in order to capture both the far range and the close range of the reversing area, if at all possible, makes it necessary to have a dual and more complex electronic installation. In addition, a protruding housing which is permanently visible can have a detrimental effect on the way the appearance of the vehicle interior is perceived.

In DE 198 24 855 A1, a camera is represented in the interior of a vehicle, the camera being installed on the inner side of the lid of a metal box which is integrated into the back shelf of the vehicle. The fact that the box lid is rotated by 180° around a central axis running in the driving direction by the operation of a motor means that the camera can be positioned from a folded-down, concealed condition in the box into a condition in which it is ready to acquire images in the plane above the back shelf. In the case of station wagons which do not have a back shelf, the box receiving the camera can be fastened laterally to a cross-beam of the vehicle body or to the inner side of the back door.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. In one aspect, a mounting assembly for an exterior attachment device which offers particularly good protection against theft of such external attachment devices is described.

In at least one example, rear-view sensor systems are developed in a way so that disadvantages of the prior art are overcome. For example, a clear and unobstructed field of view is to be provided without having to use additional cleaning systems. Systems should not be visually obtrusive, at least when not being used, and should capture the entire rear area with only a single camera. Systems should also adapt the field of view to the relevant driving situation, in particular by serving as a rear camera during reversing and during parking.

In an aspect, a position-changing apparatus can move at least one sensor, preferably a rear-view camera, back and forth between a rest position and at least one operating position. The at least one sensor may be arranged in a recess in the rest position and right behind an upper part of the rear window in the at least one operating position. However, other sensors which can capture information behind a vehicle can also be used instead of a rear-view camera. For example, a lidar (Light Detection and Ranging) sensor, among others.

The position of the at least one sensor can be altered in a translational and/or rotatory manner, preferably along the rear window via the position-changing apparatus by means of at least one actuator. The at least one actuator may include at least one electric motor, SMA actuator, pneumatic drive and/or hydraulic drive. In addition, the position-changing apparatus may include at least one telescopic extension, a rotary joint, a pneumatic cylinder and/or a hydraulic cylinder.

The recess may be arranged between the bodywork roof and the headliner and/or the at least one sensor may be mounted on a platform where the platform preferably covers the recess, in particular flush with the headliner, in the rest position. In this case, the bottom of the platform can be adapted to the headliner.

The at least one sensor may be aligned horizontally in the at least one operating position and/or may capture the rear of the vehicle in the field of view.

At least one aperture can be further mounted on the rear-view camera.

The position-changing apparatus may position the at least one sensor as a function of at least one parameter of the motor vehicle, in particular determined by the driving direction, the gear, the speed, the acceleration, the tire pressure, the steering wheel position and/or the weight of the motor vehicle, and/or as a function of at least one parameter of the surroundings of the motor vehicle, in particular determined by the road, day/night and/or the weather, and/or as a function of at least one input of the driver of the motor vehicle.

The position-changing apparatus may have predefined a plurality of operating conditions, where the operating conditions can be amended, supplemented and/or stored.

The captured image of the rear-view camera can be displayed on an internal rear-view mirror and/or on an image display apparatus in the vehicle interior, preferably on request or automatically.

In another aspect, a motor vehicle includes at least one rear-view sensor system.

A cleaning system which is usually necessary for a rear-view camera of a motor vehicle may be redundant as a result of relocating the rear-view camera from the vehicle exterior into the vehicle interior. The region below the vehicle roof behind the rear window is advantageous compared with mounting positions such as the license plate or in the brand emblem, not only in terms of soiling, but also for the purpose of protecting against damage. The region of the license plate is at very great risk, for example in situations involving a rear-end collision.

In addition, by using the position-changing apparatus provided, it is possible to individually align the field of view of the reversing area and even to transition, in a fluid manner, between far-range images during driving and close-range images during reversing.

The described rear-view camera systems also allow the rear-view camera to disappear in the headliner, providing a large degree of freedom in terms of design, they help to improve the aesthetics of the vehicle interior and they can be considered an anti-theft device. Once the rear-view camera of the rear-view camera system is stowed in its rest position, it may be hidden so that it cannot be identified as such, especially if a platform is used for the rear-view camera, the bottom of which is clad in the same way as the headliner.

The advantages described regarding rear-view cameras may also apply to other sensors such as a lidar sensor.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The term "rear-view" is here defined as a view of the surrounding area, which is not in the field of view of the driver, i.e. the directions opposing, left, right, below and above of the viewing direction, but can also include the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Figure 1A:
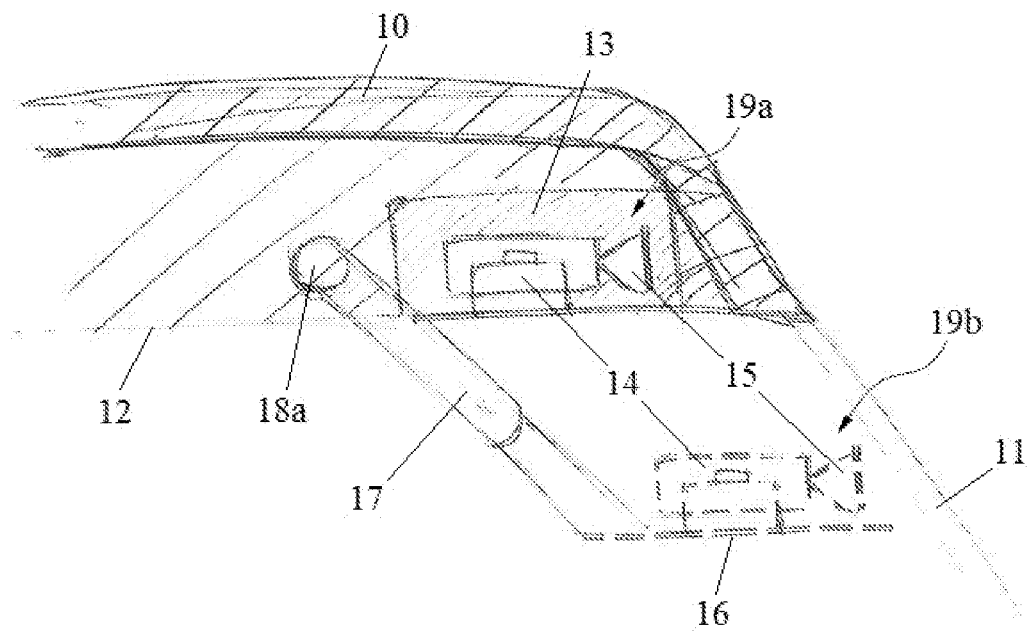
FIG. 1A is a diagram illustrating an example of a partial sectional view of a bodywork roof and of a rear window of a motor vehicle having a first rear-view camera system in a rest position and a first operating position.
Figure 1B:
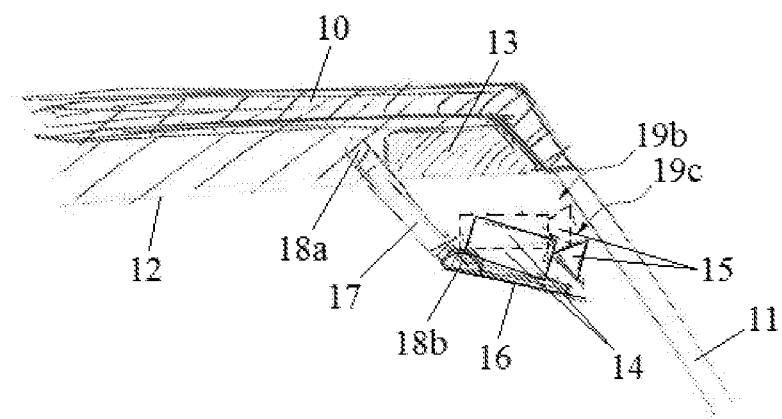
FIG. 1B is a diagram illustrating an example of a partial sectional view, similar to FIG. 1A, with a second rear-view camera system in a second operating position which is bent relative to the first operating position.

FIGS. 1A and 1B are diagrams illustrating sectional views of a rear vehicle interior which extends in the region along a bodywork roof 10 and a rear window 11 and is equipped in each case with a rear-view camera system.

A recess 13, which can receive a rear-view camera 14 together with its aperture 15, is located between the bodywork roof 10 and a headliner 12. The aperture 15 shields a camera lens of the rear-view camera 14 against stray light, in particular from a brake light (not shown) on the rear window 11. In the example illustrated in FIG. 1A, the rear-view camera 14 is assembled on a platform 16 which is rigidly connected to a telescopic extension 17. The telescopic extension 17 is rotatably mounted at a holding point 18a behind the recess 13 in the intermediate space of the bodywork roof 10 and the headliner 12.

In a rest position 19a, the rear-view camera 14 having the aperture 15 is located in the recess 13 and is fitted, together with the telescopic extension 17, in the headliner 12. In this case, the platform 16 serves as the cover plate on the underside of the recess 13 so that the entire rear-view camera system disappears in the headliner 12.

As a result of the telescopic extension 17, the rear-view camera 14 can be moved back and forth on the platform 16 from the rest position 19a along the rear window 14 into a first operating position 19b. The first operating position 19b is preferably located close behind an upper part of the rear window 11 and preferably aligns the rear-view camera 14 horizontally, as shown in FIG. 1A.

FIG. 1B shows another example, in which the platform 16 is connected to the telescopic extension 17 via a joint 18b through which the rear-view camera 14 can additionally be moved back and forth from the horizontal first operating position 19b into a second operating position 19c which is bent relative thereto and oriented downwards.

The rear-view camera can itself also be sealed against moisture or corresponding environmental influences, even if the latter only has minor effects due to the moderated influences in the vehicle interior.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

What is claimed is:

1. A rear-view sensor system for a motor vehicle, comprising
    at least one sensor in the form of at least one of a rear-view camera and a lidar sensor positioned in the motor vehicle interior between a bodywork roof and a rear window; and
    a position-changing apparatus which moves the at least one sensor back and forth between a rest position and at least one operating position,
    wherein the at least one sensor is arranged in a recess in the rest position, and is arranged directly behind an upper part of the rear window in the at least one operating position,
    wherein the recess is arranged between the bodywork roof and a headliner at a corner formed by an intersection of the bodywork roof and an upper part of the rear window,
    wherein at least one of the at least one sensor is aligned horizontally in the at least one operating position, and the at least one sensor captures a rear of the vehicle in the field of view, and
    wherein the at least one sensor is on a platform which is configured to move the sensor from the rest position in the recess to the operating position below the recess.

2. The rear-view sensor system according to claim 1, wherein the position of the at least one sensor is configured to be altered in at least one of a translational and a rotatory manner via the position-changing apparatus by at least one actuator.

3. The rear-view sensor system according to claim 2, wherein the at least one actuator comprises at least one of an electric motor, SMA actuator, pneumatic drive and hydraulic drive.

4. The rear-view sensor system according to claim 1, wherein the position-changing apparatus comprises at least one of a telescopic extension, a rotary joint, a pneumatic cylinder, and a hydraulic cylinder.

5. The rear-view sensor system according to claim 1, wherein the at least one sensor is mounted on a platform, and wherein the platform covers the recess and is flush with a headliner in the rest position.

6. The rear-view sensor system according to claim 5, wherein the bottom of the platform can be adapted to a headliner.

7. The rear-view sensor system according to claim 1, further comprising at least one aperture on the rear-view camera.

8. The rear-view sensor system according to claim 1, wherein the position-changing apparatus positions the at least one sensor as a function of at least one of
    at least one parameter of the motor vehicle, in particular determined by at least one of a driving direction, a gear, a speed, an acceleration, a tire pressure, a steering wheel position, and a weight of the motor vehicle,
    at least one parameter of the surroundings of the motor vehicle, in particular determined by at least one of a road, day and night condition, and weather, and
    at least one input by the driver of the motor vehicle.

9. The rear-view sensor system according to claim 1, wherein the position-changing apparatus comprises predefined a plurality of operating conditions, and the operating conditions are configured to be at least one of amended, supplemented, and stored.

10. The rear-view sensor system according to claim 1, wherein a captured image of the rear-view camera is configured to be displayed on at least one of an interior rear-view mirror and an image display apparatus in the vehicle interior, on request or automatically.

11. A motor vehicle comprising at least one rear-view sensor system according to claim 1.

* * * * *